UNITED STATES PATENT OFFICE.

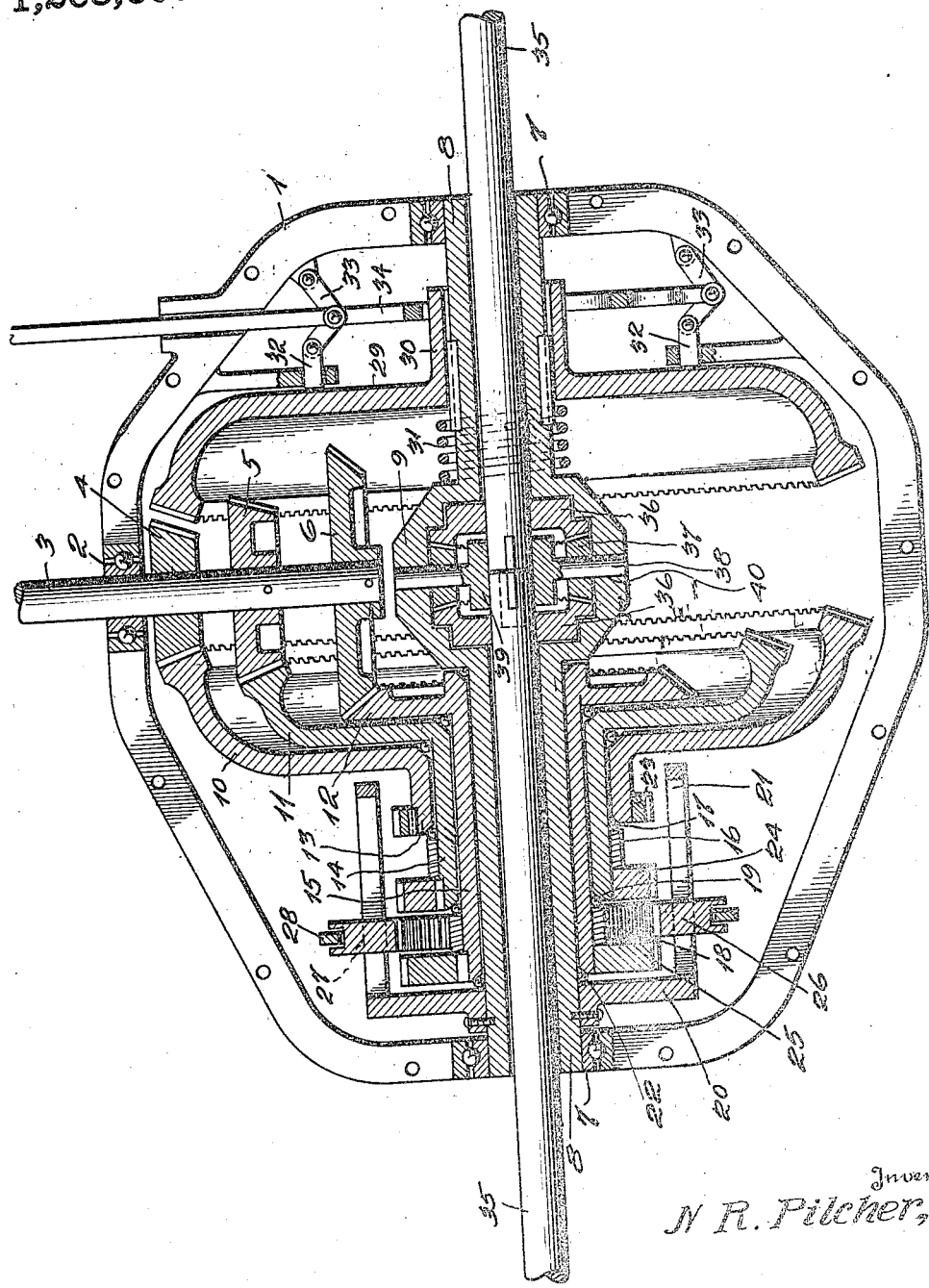

NEWTON R. PILCHER, OF AMARILLO, TEXAS.

TRANSMISSION-GEARING.

1,268,608.

Specification of Letters Patent.     Patented June 4, 1918.

Application filed April 16, 1917.   Serial No. 162,499.

*To all whom it may concern:*

Be it known that I, NEWTON R. PILCHER, a citizen of the United States, residing at Amarillo, in the county of Potter and State of Texas, have invented certain new and useful Improvements in Transmission-Gearing, of which the following is a specification.

My invention relates to improvements in variable speed transmission gearing, adapted for use upon automobiles or the like, while not necessarily restricted to such use.

An important object of the invention is to provide apparatus of the above mentioned character, which is so constructed that the various speeds may be obtained in a highly expeditious and convenient manner.

A further object of the invention is to provide apparatus of the above mentioned character, having its parts arranged in a compact manner.

Other objects and advantages of the invention will be apparent during the course of the following description.

In the accompanying drawing forming a part of this specification.

The figure is a central horizontal sectional view through apparatus embodying the invention, parts being shown in elevation.

In the drawing, wherein for the purpose of illustration is shown a preferred embodiment of my invention, the numeral 1 designates a casing, provided in its forward side with an opening receiving a ball-bearing 2.
Extending through and within this ball-bearing 2 is a driving shaft 3. This driving shaft is connected with the crank shaft of the engine, (not shown), to be driven thereby. The numerals 4, 5 and 6 designate low, intermediate, and high speed driving bevel gears, rigidly mounted upon the driving shaft 3 and disposed within the casing 1.

The casing 1 is provided in its ends with openings for receiving ball bearings 7.
Journaled within these ball bearings are the ends of tubes or sleeves 8, rigidly secured to the ends of a differential gear-casing 9. This differential gear-casing is preferably formed in two parts, as is customary. It is thus apparent that the differential gear-casing is suitably supported and is free to revolve.

The numerals 10, 11, and 12 designate low, intermediate, and high speed driven bevel gears, which permanently engage with the low, intermediate and high speed driving bevel gears 4, 5 and 6 respectively. The driven bevel gear 10 is provided with a tubular hub 13, which is rotatably mounted upon a tubular hub 14, carried by the driven bevel gear 11. The tubular hub 14 is in turn rotatably mounted upon a tubular hub 15, which is rotatably mounted upon the sleeve 8. The tubular hub 14 is preferably provided with a ring 16 rigidly secured thereto by any suitable means, and bearing balls 17 are preferably arranged between the hubs 13 and 14, as shown. The tubular hub 15 has a ring 18 rigidly secured thereto, and bearing balls 19 are preferably interposed between the tubular hubs 14 and 15, as shown. Rigidly connected with the outer end portion of the adjacent sleeve 8 is a disk or member 20, carrying a plurality of arms 21, rigidly secured thereto. These arms extend longitudinally of the sleeve 8 in parallel relation thereto, as shown. Bearing balls 22 are preferably arranged between the tubular hub 15 and the sleeve 8, as shown.

The numerals 23, 24 and 25 designate clutch-elements or clutch-gears, rigidly attached to the ends of the tubular hubs 13, 14 and 15, respectively. These gears are adapted for engagement with a shiftable clutch-element or clutch-gear 26, having openings 27 formed therein, for the reception of the arms 21. The clutch-gear 26 may be shifted by any suitable means, such as by a fork 28. From the foregoing description it is obvious that when the shiftable clutch-gear 26 is moved into engagement with the clutch-gear 23, the gear 10 will be locked to the sleeve 8, for rotation therewith. It is obvious that by suitably shifting the clutch gear 26 into engagement with clutch-gears 24 and 25 the gears 11 and 12 may be locked to the sleeve 8.

Arranged upon the opposite side of the gear 4 with respect to the gear 10, and therefore adapted to be driven in an opposite direction by gear 4, when engaging therewith, is a reverse bevel-gear 29, having a tubular hub 30, which is splined upon the adjacent sleeve 8. The bevel gear 29 normally disengages the bevel gear 4 and is held in this outer position by a spring 31. The gear 29 is shifted inwardly to engage with the gear 4 by reciprocatory members or plungers 32 pivotally connected with toggle joints 33, which are in turn pivoted to the casing 1. These toggle joints are spread by means of a reciprocatory member or rod 34, pivotally connected therewith, as shown.

The numeral 35 designates shaft or axle sections, which are independently rotatable within the sleeves 8. These shaft or axle sections project into the differential gear-casing 9, and have bevel gears 36, rigidly secured thereto. These bevel gears engage with planetary bevel gears 37, pivoted upon stub-shafts 38, formed upon a block 39 and extending within openings 40, formed in the casing 9. This is the construction of the ordinary differential gear and it is therefore thought unnecessary to further explain the same or its operation, it being sufficient to state that the shaft-sections 35 which are connected with the rear wheels of the automobile, may rotate together, as when the automobile is traveling in a straight course, or one shaft-section may rotate with respect to the other, when the automobile is rounding a curve.

The operation of the apparatus is as follows:

The driving shaft 3 may be assumed to be continuously rotated, with the shiftable clutch-gear 26 in the neutral position, and the reverse gear 29 in the outer or inactive position. To obtain either low, intermediate or high forward speeds, the operator shifts the clutch-gear 26 to the position to lock the proper gear 10, 11 or 12 to the sleeve 8 for rotation therewith. It is thus apparent that the rotation of the shaft 3 will be imparted to the sleeve 8, and through the medium of the differential gear to the shaft-sections 35. When it is desired to obtain a reverse speed, the clutch-gear 26 is shifted to the neutral position, and the rod 34 is moved forwardly to bring the gear 29 into engagement with the gear 4. The rotation of the shaft 3 is therefore reduced and transmitted in a reverse direction, to the sleeve 8, and by means of the differential gear, to the shaft-sections 35.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In transmission gearing of the character described, the combination with a driving shaft, of a driven shaft, a plurality of different speed driving gears rigidly secured to the driving shaft, a corresponding number of different speed driven gears rotatably mounted upon the driven shaft and provided with tubular hubs which telescope and have their ends arranged in stepped relation, clutch-gears rigidly connected with the tubular hubs, a disk rigidly connected with the driven shaft and carrying a plurality of arms extending substantially parallel with the driven shaft, an annular shiftable clutch-gear mounted to slide upon the arms and adapted for movement into engagement with a selected one of the clutch-gears, and means to shift the annular shiftable clutch-gear.

2. In transmission gearing of the character described, the combination with a driving shaft, of a driven shaft, a plurality of different speed driving gears rigidly secured to the driving shaft, a corresponding number of different speed driven gears rotatably mounted upon the driven shaft and provided with tubular hubs which telescope and have their ends arranged in stepped relation, clutch-gears rigidly connected with the tubular hubs, a disk rigidly connected with the driven shaft and carrying a plurality of arms extending longitudinally of the driven shaft, an annular shiftable clutch-gear mounted to slide upon the arms and adapted for movement into engagement with a selected one of the clutch-gears, means to shift the annular shiftable clutch-gear, a reverse gear splined upon the driven shaft and arranged upon the opposite side of the driving gears with respect to the driven gears and adapted for movement into and out of engagement with and from one driving gear, and means to shift the reverse gear.

3. In transmission gearing of the character described, the combination with a differential gear comprising a gear casing, sleeves connected with the gear casing and arranged upon opposite sides thereof, shaft sections extending through the sleeves into the gear casing, gears arranged within the gear casing and connected with the shaft sections, planetary gears pivotally connected with the gear casing and engaging the first named gears, a driving shaft arranged at approximately a right angle to the sleeves in proximity to the differential gear, a plurality of different speed driving gears rigidly secured to the driving shaft, a corresponding number of different speed driven gears rotatably mounted upon one of the sleeves and provided with tubular hubs which telescope and have their ends arranged in stepped relation, a clutch gear rigidly connected with the ends of the tubular hubs, a disk rigidly connected with the driven shaft and carrying a plurality of arms extending substantially parallel with the driven shaft, an annular shiftable clutch-gear carried by the arms to move longitudinally thereof into engagement with a selected one of the clutch-gears, means to shift the annular shiftable clutch-gear, a reverse gear splined upon the other sleeve and arranged upon the opposite side of the driving gears with respect to the driven gears and adapted for movement into and out of engagement with and from one driving gear, and means to shift the reverse gear.

In testimony whereof I affix my signature.

NEWTON R. PILCHER.